No. 873,629.
PATENTED DEC. 10, 1907.
F. STORM.
HYDROMETER TESTING JAR.
APPLICATION FILED FEB. 16, 1907.
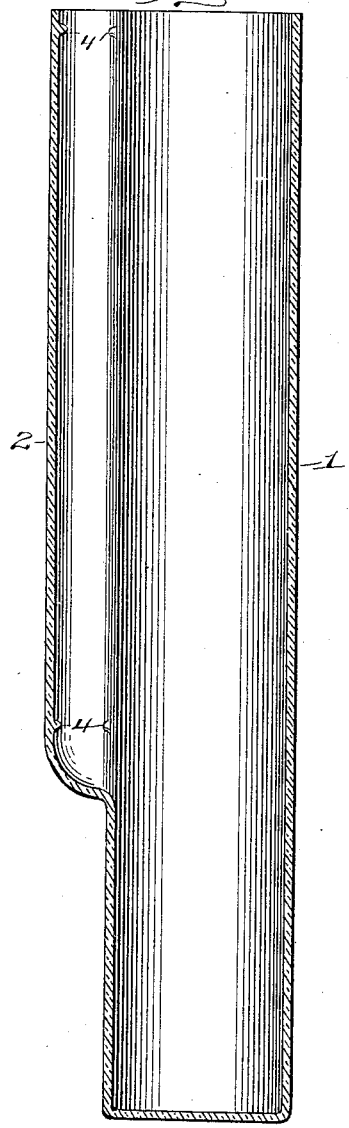
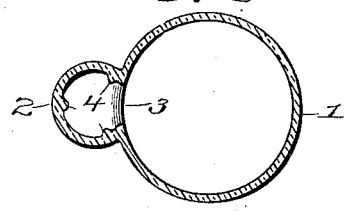
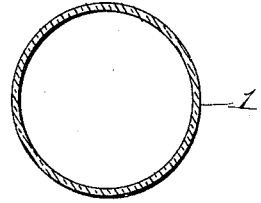
Witnesses
J. M. Fowler Jr
L. L. Morrill
Inventor
Francis Storm
By Mason, Fenwick & Lawrence
Attorneys

UNITED STATES PATENT OFFICE.

FRANCIS STORM, OF NEW YORK, N. Y.

HYDROMETER TESTING-JAR.

No. 873,629.     Specification of Letters Patent.     Patented Dec. 10, 1907.

Application filed February 16, 1907. Serial No. 357,745.

*To all whom it may concern:*

Be it known that I, FRANCIS STORM, a citizen of the United States, residing at New York, in the county of New York and State of New York, have invented certain new and useful Improvements in Hydrometer Testing-Jars; and I do hereby declare the following to be a full, clear, and exact description of the invention, such as will enable others skilled in the art to which it appertains to make and use the same.

This invention relates to improvements in means for determining the specific gravity, density and strength of liquid by flotation, and has for its object to provide a device that will permit the simultaneous reading of the hydrometer and the simultaneous correction of any deviation in the temperature at which the hydrometer is standardized.

In the accompanying drawings:—Figure 1 represents a vertical section through my improved testing jar. Fig. 2 is a horizontal section taken on line 1—1 of Fig. 1. Fig. 3 is a section through Fig. 1 on line 3—3.

In the production of testing jars I have found it desirable to provide jars with communicating chambers for accommodating the liquid to be tested and the means for testing the same. A device constructed according to the present invention is designed to provide a testing jar with communicating chambers, and to provide a substantially independent chamber for the thermometer, and a substantially independent chamber for the hydrometer, but so arranged as to give the liquid a free passageway therebetween.

Referring more particularly to the drawings, 1 indicates a testing jaw substantially circular and 2 an auxiliary jar or receptacle secured to jar 1. Instead of making one or more communicating passages between jars 1 and 2 I provide an opening or slot 3 the full length of the auxiliary jar 2 so that liquid in the main jar 1 has free communication with the interior of the jar 2 at all points thereof.

In operation it is designed to place the hydrometer in the large jar 1 and a thermometer in jar or chamber 2. The liquid having been placed in jar 1 will, as will be evident, fill the auxiliary jar or chamber 2 to the same level as jar 1 and with liquid at the same temperature as the temperature of the liquid which is designed to be tested. By having the slot or opening 3 the entire length or nearly the entire length of the auxiliary tube or jar 2 the liquid in the auxiliary tube in which the thermometer is placed will not cool any more rapidly than in jar 1 and consequently the testing or reading of the thermometer and hydrometer will be more accurate than if a single aperture were provided for accommodating liquid to the auxiliary jar 2.

If desirable small projections or lugs 4 may be provided within the auxiliary tube 2 for supporting the same and for preventing the thermometer from resting against the opening 3. By lugs 4 the thermometer is held substantially centrally of the auxiliary jar 2 and will thus permit the liquid being tested to entirely surround the same and cause the thermometer to correctly show the temperature thereof.

In constructing a device according to the present invention, I preferably construct the same from glass, but any other substance will answer the purpose, but a transparent substance is always preferable as the thermometer may be read without removing the same from the jar 2, and also the hydrometer may be read if desirable without removing the same from the jar 1.

Having thus fully described my invention, what I claim as new and desire to secure by Letters Patent is:—

1. A testing tube, comprising a hollow receptacle adapted to contain a hydrometer, an auxiliary hollow receptacle secured to said first mentioned hollow receptacle, said auxiliary receptacle being in communication with said first mentioned receptacle the entire length of said auxiliary receptacle, and lugs near the top and near the bottom of said auxiliary receptacle for holding centrally thereof a thermometer so as to permit free circulation of liquid about the same.

2. A device of the character described, comprising a primary tube adapted to contain a hydrometer, an auxiliary tube positioned parallel and formed integral with said primary tube, said auxiliary tube being of less diameter and length than said primary tube, said primary tube and auxiliary tube contacting the entire length of the auxiliary tube, said tubes being formed with a slot at the point of juncture thereof and communicating the entire length of said auxiliary tube, and a plurality of lugs near each end of said auxiliary tube for loosely supporting a thermometer centrally thereof.

In testimony whereof I affix my signature in presence of two witnesses.

FRANCIS STORM.

Witnesses:
L. L. MORRILL,
A. L. MOCK.